United States Patent [19]

Farmer et al.

[11] Patent Number: 4,872,146

[45] Date of Patent: Oct. 3, 1989

[54] METHOD AND APPARATUS FOR SIMULATING PHASE COHERENT SIGNAL REFLECTIONS IN MEDIA CONTAINING RANDOMLY DISTRIBUTED TARGETS

[75] Inventors: David M. Farmer, Saanichton; R. Del Huston, Victoria, both of Canada

[73] Assignee: Canadian Patents & Development Limited, Ottawa, Canada

[21] Appl. No.: 197,386

[22] Filed: May 23, 1988

[51] Int. Cl.$^4$ .............................................. H01S 9/66
[52] U.S. Cl. .......................................... 367/87; 367/97
[58] Field of Search ............... 367/87, 88, 92; 342/26, 342/194; 340/601, 602, 627; 73/170 A, 170 R

[56] References Cited

U.S. PATENT DOCUMENTS

| | | |
|---|---|---|
| 3,012,222 | 12/1961 | Hagemann . |
| 3,170,135 | 2/1965 | Yagelowich . |
| 3,174,127 | 3/1965 | Haslett . |
| 3,286,224 | 11/1966 | Zeeting . |
| 3,461,421 | 8/1969 | Stover . |
| 3,673,552 | 6/1972 | Mross . |
| 3,696,328 | 10/1972 | Schwartz . |
| 3,928,840 | 12/1975 | Spindel . |
| 3,950,724 | 4/1976 | Honda . |
| 3,987,404 | 10/1976 | Woodruff . |
| 4,081,783 | 3/1978 | Honda . |
| 4,101,889 | 7/1978 | Evans ............................ 342/194 X |
| 4,213,195 | 7/1980 | Pridham ................................ 367/92 |
| 4,225,951 | 9/1980 | Menin et al. . |
| 4,290,125 | 9/1981 | Honda . |
| 4,446,542 | 5/1984 | Beckerle . |
| 4,463,356 | 7/1984 | Short, III et al. .............. 342/194 X |
| 4,509,151 | 4/1985 | Anderson . |
| 4,800,541 | 1/1989 | Farmer et al. ................... 367/118 X |

FOREIGN PATENT DOCUMENTS 2159947 12/1985 United Kingdom ................... 367/88

OTHER PUBLICATIONS

Spindel, R. C. and P. T. McElroy, "Level and Zero Crossings in Volume Reverberation Signals", J. Acous. AM. vol. 53, 1417-1462 (1973).

Denbigh, P. N. and J. Weintroub, "A statistical Approach to Fish Stock Assessment", 1986 Acoustics Conference, Dept. of Engr. Physics, Technical University of N.S.

Stanton, T. K. and C. S. Clay, "Sonar Echo Statistics as a Remote-Sensing Tool: Volume and Seafloor". IEEE Journal of Oceanic Engr., vol. OE-11, 79-96 (1986).

Barakat, "Probability Density Functions of Sums of Sinusoidal Waves Having Nonuniform Random Phases and Random Numbers of Multipaths", J. Acoust. Soc. AM. 83(3), pp. 1014-1022 (1988).

Etemad, S. et al., "Weak Localization of Photons; Universal Fluctuations and Ensemble Averaging", Physical Review Letters, vol. 57, No. 5, 575-578 (1986).

Kaveh, M. et al., "Weak Localization and Light Scattering from Disordered Solids", Physical Review Letters, vol. 57, No. 16, 2049-2052 (1986).

Barakat, "Weak-Scatterer Generalization of the K-Density Function", J. of the Optical Society of America, Vol. 4, 1213-1219 (1981).

Primary Examiner—Thomas H. Tarcza
Assistant Examiner—Tod Swann
Attorney, Agent, or Firm—Klarquist, Sparkman, Campbell, Leigh & Whinston

[57] ABSTRACT

A method of simulating phase coherent signal reflections in media containing randomly distributed targets capable of scattering signals transmitted through the media, wherein the energy of signals directly scattered by the targets is significantly greater than the energy of signals multiply scattered by the targets. A reference signal having a wavelength which is small in comparison to the mean spacing between the targets is modulated and then transmitted through the target-containing medium. The targets produce scattered echoes of the signal, from which normalized in-phase and quadrature components are derived and separately, cumulatively summed, "n" times, until their variance becomes a linear function of $1/n$.

11 Claims, 4 Drawing Sheets

METHOD AND APPARATUS FOR SIMULATING PHASE COHERENT SIGNAL REFLECTIONS IN MEDIA CONTAINING RANDOMLY DISTRIBUTED TARGETS

FIELD OF THE INVENTION

This application pertains to a method and apparatus for simulating phase coherent signal reflections in media containing randomly distributed targets. The invention facilitates determination of the mean spacing between the targets (or equivalently determination of the density of the targets); determination of the mean scattering strength of the targets; and, determination of a stable phase relative to the transmission pulse, from a backscattered signal.

BACKGROUND OF THE INVENTION

There are various acoustic techniques for estimating the number density (i.e. population size) of biological or particulate matter in the ocean. However, such techniques are typically only capable of estimating the order of magnitude of such populations, due to the highly random nature in which they are distributed.

The prior art techniques typically employ a single frequency pulsed echo sounder having transmit and receive capabilities. Biological or particulate matter in the ocean region through which the acoustic signal is transmitted scatter the signal. The receiver receives a backscatter signal containing both amplitude and phase information. However, the prior art techniques aforesaid utilize only the backscatter signal amplitude information, because the phase information contained in successive backscatter signals emanating from the randomly distributed target population is also randomly distributed. Accordingly, the prior art techniques aforesaid are unable to make effective use of the backscatter signal phase information.

It would be highly useful to employ the phase information contained in the received backscatter signals. Sonar signalling techniques for underwater speed measurement and echo location and other related techniques require precise determination of the delay between the time at which an acoustical signal pulse train is propagated into the water and the time at which the signal (or a backscatter reflection of the signal) is received. It happens that the phase angle of the received acoustical pulse, together with pulse amplitude information, permits more accurate time (i.e. signal propagation delay; and therefore distance) measurements to be made than those attainable by working with only the amplitude information contained in the received pulse. Thus, the problem is to measure accurately the phase angle of the received pulse relative to that of the transmitted pulse. The problem is compounded by the random target distributions of the sort presently of interest. As previously indicated, successive measurements of the phase of the backscatter signal produced by randomly distributed target populations are not individually useful because they are also randomly distributed.

The present invention provides a technique for coherently summing the full acoustical backscatter signals which are received. By separating preserving and summing the in-phase and quadrature components characterizing the received backscatter signals, one may simulate the backscatter signal which would have been obtained, had the target population been more densely distributed. More particularly, by utilizing an iterative process in which the in-phase and quadrature components characterizing successive backscatter signals are separately summed, one may simulate phase coherent signal reflections from the randomly distributed target population, notwithstanding the fact that individual received backscatter signals are incoherent with respect to one another. The technique can be shown to facilitate highly accurate determination of the mean spacing between the randomly distributed targets; determination of the density of the targets (and therefore determination of the number of targets); and, determination of the mean target strength.

It is expected that the invention will have particular application in relation to the location and identification of certain fish populations for commercial fishing and/or fisheries management conservation purposes. However, it is important to recognize that the technique is not restricted to situations in which the randomly distributed target population is in water, or even to situations in which the population is in a liquid. For example, it is expected that the technique will offer important advantages in the study of piped fluids such as oil or other commercially valuable substances. Accurate determination of the characteristics of randomly distributed populations of targets such as solid particles or gas bubbles contained in such fluids; namely, the mean target spacing, the target population density (and therefore the number of targets) and the size of the targets in a rapid, efficient manner would be highly useful in many applications where such measurements are not presently possible so far as the inventors are aware. The technique is also expected to offer advantages in certain electromagnetic applications, such as in rain-radar techniques.

SUMMARY OF THE INVENTION

In accordance with the preferred embodiment, the invention provides a method of simulating phase coherent signal reflections in a medium containing a random distribution of targets which are capable of scattering signals transmitted through the medium, provided that the energy of signals directly scattered by the targets is significantly greater than the energy of signals which are multiply scattered by the targets. A reference signal having a wavelength ("$\lambda$") which is small in comparison to the expected mean spacing between the targets is modulated and then transmitted through the medium. The targets produce scattered echoes of the signal. The scattered echo signals are received and in-phase and quadrature components of the received signals are then derived and separately summed and normalized, giving estimates of the mean In-phase ($\bar{I}$), and Quadrature ($\bar{Q}$) components. Groups of these cumulative estimates of $\bar{I}$ and $\bar{Q}$ are then used to fine their variance. A transformation of the number of independent realizations ($n_i$), leads to a linear relationship between the variance and $1/n_i$; the slope of a line fitted to the resulting distribution can then be used to determine the number of targets in the scattering volume.

Having determined $\bar{I}$ and $\bar{I}$, the corresponding amplitude $\bar{A}$ and phase $\bar{\theta}$ can be found from the usual transformation to polar co-ordinates; i.e.

$$\bar{A} = \bar{I}^2 + \bar{Q}^2$$

$$\bar{\theta} = \text{Arctan}\ (\bar{Q}/\bar{I}).$$

Advantageously, target populations lying within selected regions of the target-containing medium are examined by delaying commencement of the scattered echo signal receiving step for a selected time interval after transmission of the modulated reference signal through the medium and then performing the scattered echo signal receiving step for a further selected time interval.

If the target-containing medium is water, and if the targets are fish, then the reference signal wavelength is preferably significantly greater than the expected mean length of the fish.

The invention also facilitates determination of the mean number of targets No (r) and the target number density p(r) within the scattering volume.

DETAILED DESCRIPTION OF THE PREFERRED EMBODIMENT

Introduction

Figure 1:
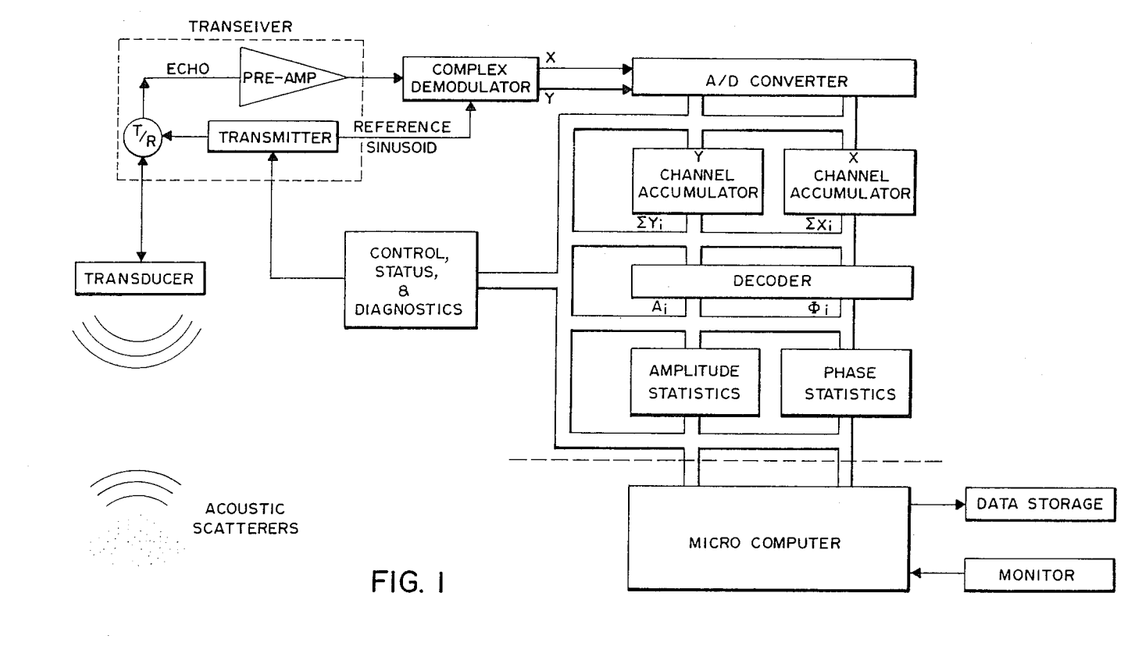
FIG. 1 is a block diagram of apparatus constructed in accordance with the preferred embodiment of the invention.
Figure 2:
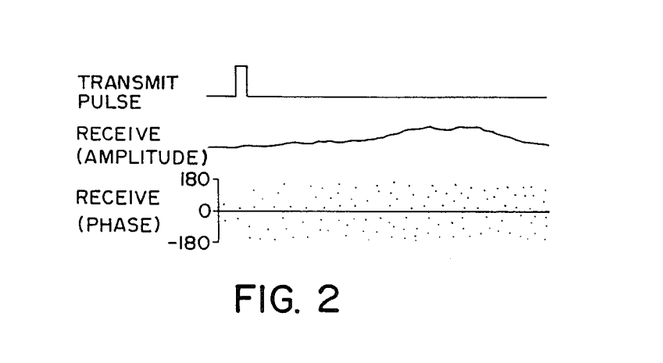
FIG. 2 depicts signal waveforms representative of the transmitted reference signal, the amplitude portion of the received scattered echo signal and the phase portion of the received scattered echo signal respectively.

For simplicity, consider the monostatic echo-sounder configurations of FIGS. 1 and 2. The only difference between the FIG. 1 configuration and a standard echo sounder is that the received signal is complex demodulated, so as to recover both in-phase and quadrature components for recording and analysis. Echo-sounders with complex demodulation are equivalent to the type of acoustic systems used for Doppler measurement of current profiles. The Doppler frequency, or first moment of the Doppler spectrum, is linearly related to the mean flow speed or velocity component, resolved along the axis of the acoustic beam.

While the mean velocity component is of great interest, the first moment of the Doppler spectrum provides no information about the random component of motion of a population of targets which are randomly distributed in the medium through which the acoustic signals are transmitted, or of their spatial density; nor does it provide, apart from the overall measure of backscatter strength, an effective means for assessing other acoustic properties of the backscatter signal which might be used in species identification. The random component of motion or Doppler spreading, has been studied in relation to turbulence measurements [Lhermitte, R. and R. Serafin, "Pulse-to-Pulse Coherent Doppler Sonar Signal Processing Techanicues," J. Atmos. Ocean Tech., 1, 293–308, (1984)]. Measurement of the absolute orientation of the acoustic signal vector however, which can contain useful information about the targets, requires a new approach facilitated by the present invention.

Statistics of Stochastic Scattering From Plankton and the Use of Coherent Processing Under normal circumstances targets such as zooplankton are randomly located and tend to be far apart from each other relative to the wavelength of sound most useful for detecting their presence (i.e. $\lambda = 0.5$–3 cm). A coherent pulse of acoustic energy is therefore scattered at random ranges (FIG. 2) yielding a random phase on reception. If the scatterer positions remain sufficiently coherent in space over some short period, typically a few milliseconds, then components of their motion will contribute to the rate of phase change, whose first and second moments provide useful information on their motion, as discussed above. If the separation between pulses is greater than the 'decorrelation time', the scatterer positions are again random, and a new random phase will be detected.

It might seem unrealistic to expect to acquire useful information about the plankton target distribution from the acoustic phase under these circumstances; nevertheless it turns out that the statistical properties of the signal allow one to learn about their concentration, or equivalently, the 'mean target spacing', and provide a means of characterising their size and structure.

The statistics of sonar volume backscatter have been discussed [Clay, C. S. and B. G. Heist, "Acoustic scattering by fish—Acoustic models and a two-parameter fit". J. Acous. Soc. Am. 75, 1077–1083 (1984); and Stanton, T. K. and C. S. Clay, "Sonar echo statistics as a remote-sensing tool: volume and sea-floor", IEEE Journal of Oceanic Engineering, Vol. OE-11, 79–96 (1986)] especially in connection with scatter from various types of fish. A concept that finds application in these studies is the simultaneous presence in the signal of both a coherent and an incoherent component. Previous work has focussed on the use of amplitude statistics of the full complex signal; however it will be shown that the statistics of the full complex signal can provide a sensitive probe of the distribution and properties of the acoustic targets.

Statistical Background

Lord Rayleight [Rayleigh, Lord (J. W. Strut), The Theory of Sound Vol. 1 (2nd Eds., 1894 and 1896), Dover, N.Y., 1945] was the first to show that if n sources with uniform amplitude have random phases then in the limit n, the amplitude probability distribution function (hereinafter, "pdf"), P(A) is given by, $$P(A) = \frac{A}{\sigma^2} \exp\left[-\frac{A^2}{2\sigma^2}\right]. \tag{1}$$

P(A) is known as the Rayleigh distribution. It has the unique characteristic of being completely defined by the single parameter $\sigma^2$ which is equivalent to the variance of the received amplitude.

The Rayleigh distribution also applies to a uniform spatial distribution of discrete scatterers with a mean spacing greater than the insonifying wavelength, which is typical for acoustic scattering from zooplankton. When these targets are randomly distributed in space the phase from each target will have a uniform pdf, hereafter referred to as the "incoherent field". The statistics of this type of problem were first developed by Rice [Rice, S. O., "Mathematical analysis of random noise, II". Bell System Tech. J., 24: 46 (1945)]. When a coherent signal is present in an incoherent field the statistical properties will be altered. The problem of amplitude statistics for this case has been widely discussed in the literature; however the following discussion develops the interesting case of phase statistics, which have special application to zooplankton studies.

The signal scattered by a group of targets about $\bar{r}=(x,y,z)$, for a narrow band signal with center frequency can be represented by, $$u[\bar{r}(t)] = A_{in}[\bar{r}(t)]e^{i\omega t} + A_{co}[\bar{r}(t)]e^{i\omega t}. \quad (2)$$

The $A[\bar{r}(t)]$ terms are complex phasor amplitudes with modulus $|A[\bar{r}(t)]|$ and argument $\phi(t)$. The subscripts "in" and "co" refer to the incoherent and coherent signals respectively. In general, $$A[\bar{r}(t)] = \sum_{j=1}^{N} |A_j[\bar{r}(t)]|\exp[i\phi_j(t)] \quad (3)$$

where "N" represent the total number of targets from the insonified volume at r. This summation can best be understood as a random walk in the complex plane.

For the incoherent signal each term is statistically independent. The resulting amplitude (envelope of the received signal) will follow Rayleigh statistics for large N and the phase will be uniformly distributed. A pure coherent signal however will have a constant phase value $\phi_j = \phi_o$ so that the resulting amplitude becomes the sum of the individual values. When the coherent properties are stable (reflective properties remain constant) both the resulting amplitude and phase of the received signal will have Dirac delta functions for their pdfs (assuming the system noise is negligible).

The in-phase and quadrature components of the received signal, X and Y respectively, can be represented by, $$X = a_o\cos\phi_o + \sum_{j=1}^{N} a_j\cos\phi_j = x_{co} + x_{in} \quad (4)$$

$$Y = a_o\sin\phi_o + \sum_{j=1}^{N} a_j\sin\phi_j = y_{co} + y_{in}$$

where the amplitude and phase of the coherent signal are represented by a $a_o$ and $\phi_o$. When the terms in the summation are independent random variables, Gaussian statistics can be used to describe $x_{in}$ and $y_{in}$. As $N \to \infty$ the central limit theorem (c.f. Davenport, W. B. (Jr.) and W. L. Root, "An Introduction to the Theory of Random Signals and Noise". McGraw-Hill, N.Y., 1958) states that the probability distribution of a sum of N independent random variables approaches a normal distribution. Since quadrature components are uncorrelated, the joint pdf of $x_{in}$ and $y_{in}$ will be given by, $$P(x_{in},y_{in}) = P(X,Y) = \quad (5)$$

-continued $$\frac{1}{2\pi\psi}\exp\left[\frac{-1}{2\psi}((X-x_{co})^2 + (Y-y_{co})^2)\right]$$

where, $\Psi = \langle(X-x_{co})^2\rangle = \langle(Y-y_{co})^2\rangle$. It is more desirable to transform these statistics into amplitude A and phase space:

$$X = A\cos\Phi \quad (6)$$

$$Y = A\sin\Phi \quad (6)$$

Then, $$P(A,\Phi)dAd\Phi = \quad (7)$$

$$\frac{A}{2\pi\psi}\exp\left[-\frac{1}{2\psi}(A^2 + a_o^2 - 2Aa_o\cos(\Phi - \phi_o))\right]dAd\Phi.$$

Figure 3:
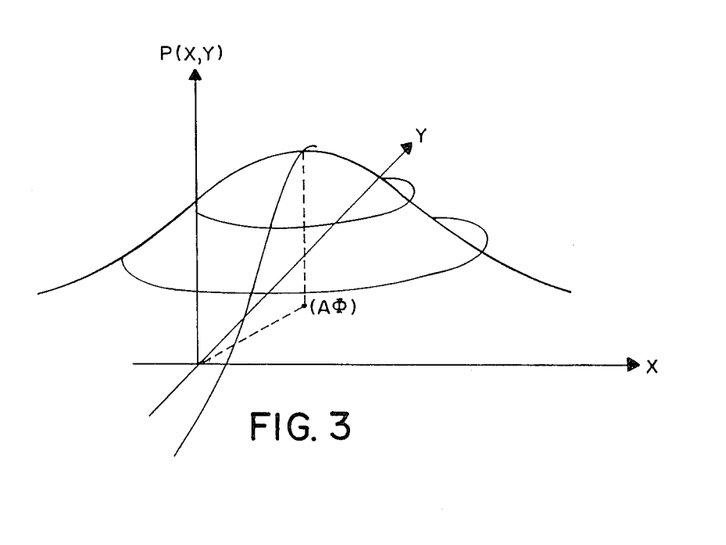
FIG. 3 is a graph which depicts the probability distribution of the in-phase ("X") and quadrature ("Y") components of the scattered echo signal.

A diagram of P(X,Y) and P(A,Φ) is shown in FIG. 3.

For the case of an incoherent signal the corresponding phase pdf is uniform [Ishimaru, A., "Wave Propagation and Scattering in Random Media, Vol. 1", Academic Press, N.Y., 1978]. However a pure coherent signal will have a delta function phase pdf centered about the reference phase $\Phi_o$.

P(Φ) is determined by finding the probability of an event occurring within an angular sector defined by Φ and Φ=dΦ. This corresponds to integrating the joint pdf (7) over all possible values of A $$P(\Phi)d\Phi = \int_0^{\infty} P(A,\Phi)dAd\Phi. \quad (8)$$

Figure 4:
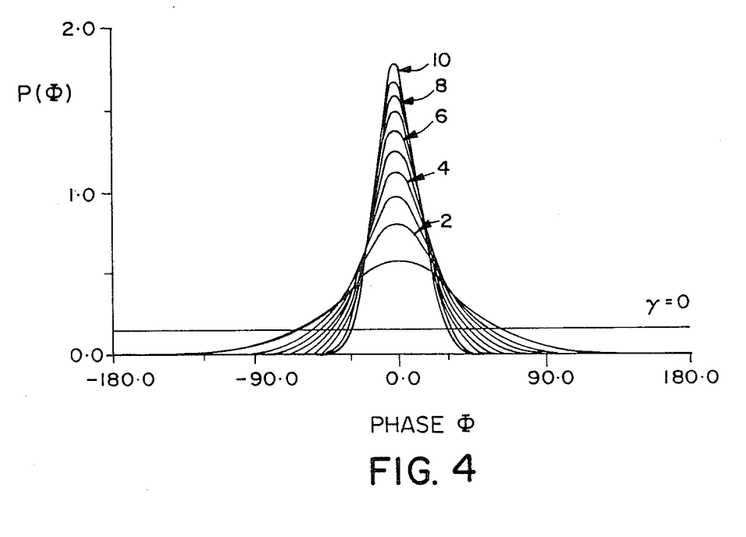
FIG. 4 is a graph on which the phase probability function $P(\Phi)$ is plotted as the ordinate, versus phase ($\Phi^2$) as the abscissa for different values of the ratio of coherent to incoherent energy.

The resulting integration yields, $$P(\Phi) = \frac{1}{2\pi} e^{-\gamma} + \quad (9)$$

$$\frac{\sqrt{\gamma}}{2\sqrt{\pi}} \cos\Phi\exp[-\gamma\sin^2\Phi]\left(1 + \frac{\cos\Phi}{|\cos\Phi|} erf(\sqrt{\gamma}\cos\Phi)\right),$$

where $\gamma = a_o/2\psi$, which is the ratio of coherent to incoherent energy in the signal. A plot of P(Φ) for $-\pi \leq \Phi \leq \pi$ and various values of γ is given in FIG. 4. A continuous transition from a uniform distribution when γ=0 to a Gaussian centered about Φ=0 for larger γ is observed. Equation (9) is evaluated for a zero phase offset $\phi_o = 0$. FOr $\phi_o \neq 0$ a simple transformation is applied. These results are also consistent with the interpretation of a pure incoherent signal when =0 and a pure coherent signal when $\gamma^{311}=0$.

The $\gamma_{th}$ phase moment is generated by evaluating, $$\langle\Phi^{\nu}\rangle = \int_{-\pi}^{\pi} \Phi^{\nu}P(\Phi)d\Phi. \quad (10)$$

For simplicity we will assume $\langle\Phi^1\rangle = 0$ in this analysis although, in general, the appropriate phase offset $\phi_o$ must be included.

Figure 5:
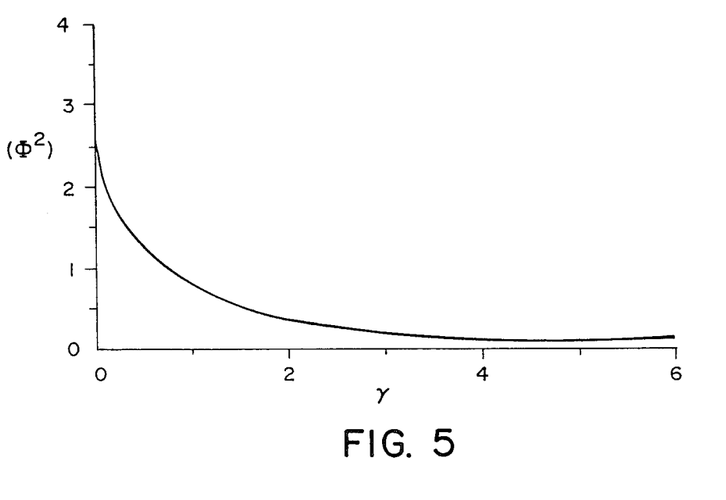
FIG. 5 is a graph on which the numerically evaluated relationship between the second moment of phase ($\Phi^2$) is plotted as the ordinate, versus the ratio of coherent to incoherent energy.

An analytic evaluation of (10) leads to multiple infinite sums of transcendental functions, so that it is more useful to insert (9) into (10) and evaluate numerically. FIG. 5 shows the result. The second moment of phase decreases sharply as the ratio of coherent to incoherent signal γ increases in the range $0 < \gamma < 1$.

An empirical expression for this relationship is, $$<\Phi^2> = \frac{\pi^2}{3} e^{-f(\gamma)} \qquad (11)$$

where $f(\gamma)$ is a 3rd order polynomial,
$f(\gamma) = 0.329 + 1.34\gamma - 9.239\gamma^2 + 0.0186\gamma^3$
and has a variance of $\pm 0.0143$ for $\gamma \leq 5$.

Coherent Processing

Coherent processing involves the coherent summation of the complex signal over successive transmissions. This procedure is equivalent to increasing the ratio $\gamma$ of coherent to incoherent energy in the acoustic signal, as will now be shown.

The echo from each transmission is a one-dimensional distribution. This may be represented, for example, by a binary distribution in which the absence or presence of a target at a particular range R, of width $\delta R$, can be represented by a 0 or 1 respectively. Since the number of targets in a particular sequence is random, the binary representation is a Poisson process [Miller, I. and J. E. Freund, "Probability and Statistics for Engineers". Prentice-Hall, N.J., 1985].

For a large number of digits, the Poisson process is described by the Poisson distribution and the probability of k events (i.e. targets) occurring, is $$P(k;\mu) = e^{-\mu} \frac{\mu^k}{k!} \qquad (12)$$

where $\mu$ is the mean number of events. Thus, for a large number of ranges, with $\mu$ representing the mean number of targets between R and $R + \delta R$, the probability of k targets occurring is $P(k;\mu)$.

Coherent processing of successive echoes simulates higher scatterer densities, because it incorporates the superposition of the scattered signal from each target. This can also be represented by the addition of binary strings. The sums $S_1, \ldots, S_n$ for each range gate will then correspond to the number of targets in those range gates when summed over the total (l) number of processed echoes. When each echo is independent of previous echoes (i.e. the delay between successive transmissions exceeds the decorrelation time), the statistics at each range correspond to a Poisson process. As the number of processed signals (l) increases, the Poisson distribution becomes a good approximation. For $\mu < 30$ the Poisson distribution approximates a Gaussian distribution [Barford, N.C., "Experimental Measurements: Precision, Error, and Truth, Addison-Wesley, London, 1967] with, $$P(k,\mu) \simeq \frac{1}{\sqrt{2\pi\mu}} \exp\left[\frac{(k-\mu)^2}{2\mu}\right] \text{ for } k \geq 0. \qquad (13)$$

This transition from a Poisson to a Gaussian distribution has the same physical interpretation as the Ricean distribution discussed earlier. The mean corresponds to the specular component and the standard deviation corresponds to the incoherent component, with $$\gamma = \frac{\mu}{2}. \qquad (14)$$

Thus a superposition of discrete systems of random events evolves from a random sequence (Poisson distribution) to a Gaussian distribution. As the number of superpositions increases, so also does the ratio of coherent to incoherent signals $\gamma$.

Mean Target Spacing

Figure 6:
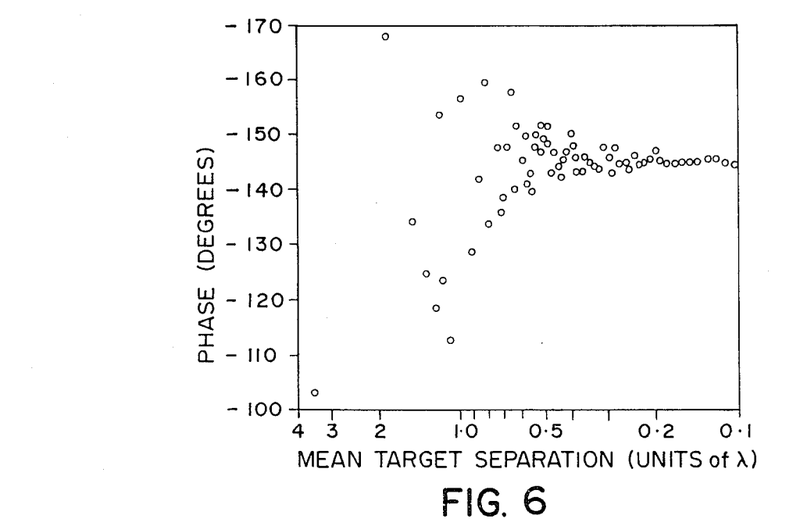
FIG. 6 is a graph on which the composite phase (expressed in degrees) determined by numerical evaluation of received scattered echo signals from a model cube having sides of 28.6$\lambda$ is plotted as the ordinate for different mean target spacings (expressed in units of wavelength).

Convergence of phase measurement with successive superposition of random target distributions can be demonstrated numerically. FIG. 6 shows successive phases for modelled echoes from a cube of side $28.6\lambda$. With each superposition the effective scatterer density increases; the phase is therefore plotted as a function of mean target spacing. For large separations the phase is essentially random. As the mean target separation decreases through $\approx 0.5\lambda$, the phase rapidly converges to a stable value.

Calculations of this type can be repeated several times for random target distributions, so as to determine the way in which the second moment of phase, or equivalently the ratio of coherent to incoherent signal, varies with mean target separation.

Figure 7:
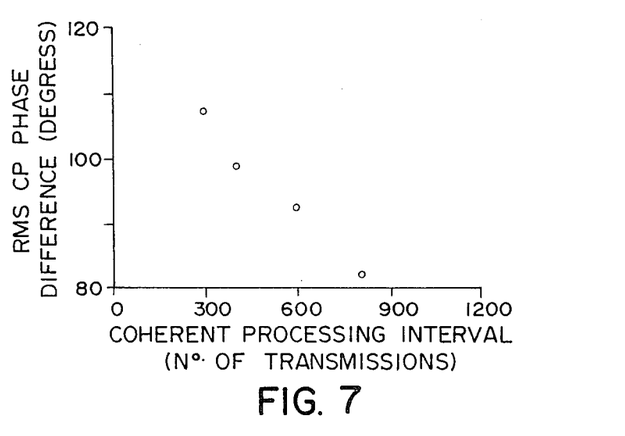
FIG. 7 is a graph on which observations of rms phase difference between two interleaved data sets are plotted as the ordinate, versus coherent processing interval.

FIG. 7 shows an example of phase convergence for backscatter data obtained in Saanich Inlet, British Columbia, Canada at a frequency of 215 kHz. The bistatic system used in this experiment is sensitive to refractive effects (in fact the goal of the measurements was to detect these); but these effects are removed by forming two interleaved data sets from the original time series and calculating the rms phase difference. Initially the phase is essentially random, but after about 300 superpositions the rms phase difference decreases, reaching a minimum of 85°, corresponding to an accuracy bound for the 2N data set of $\pm 42.5°$. For larger numbers of superpositions, heterogeneity in the target distribution causes the phase difference to diverge again.

Estimation of population density by complex superposition

The parameters which influence the received signal from a scattering volume include: transmit and receive beam patterns, spherical spreading losses, absorption losses, transmit pulse shape and scattering strength distribution. The present discussion applies to a monostatic transducer configuration where the transmit and receive beam patterns are equivalent; however the method also applies to general bistatic transducer configurations. Practical transducer designs utilize narrow bandwidth transmission and this method takes advantage of this constraint. The transmit pulse f(r) is not a perfect square wave due to bandwith limitations. Other pulse shapes such as Gaussian or Triangular forms are also acceptable in these developments. At a given range, $r = r_o$, the insonified volume is contained within the pulse length and the main lobe of the transmit/receive beam patterns. For a beam pattern which is symmetric about its acoustic axis, the main lobe can be represented by a Gaussian. The amplitude weighting function of the beam pattern $B(\theta)$ (from transmit and receive) is then given by, $$B^2(\theta) = \frac{1}{2\pi <\theta^2>^{\frac{1}{2}}} \exp(-\theta^2/2<\theta^2>) \qquad (15)$$

over the range $\theta \leq \pi/2$, where $\theta$ is the angle from the acoustic axis and $2<\theta^2>^{\frac{1}{2}}$ is the $-3$ dB beam width. Notice that $B^2(\theta)$ is a normalized weighting function. For a population density $\rho(r)$ the number of insonified targets per unit range N(r) is dependent on the transmit and receive beam patterns and given by, $$N(r) = 2\pi r^2 \rho(r) \int_0^{\pi/2} B^2(\theta)\sin(\theta)d\theta. \quad (16)$$

Range dependent signal attentuations are primarily due to spherical spreading from source to target and target to receiver. This introduces a $1/r^2$ loss in amplitude. The amplitude of the total echo from a range window $\Delta r$ (determined by the half power points of the transmit pulse or twice the standar deviation of f(r)) will also depend upon the target strength distribution p(a).

In the simplest case, the targets will have all the same reflectivities and the distribution p(a) can be represented by a Dirac delta function $\delta(a-a_o)$ where $a_o$ is the reflectivity of a single target. In some cases, for example for targets of biological origin, p(a) may be represented by some other function, such as a Gaussian with mean value $a_o$ and variance $\sigma_a^2$.

For all physical scattering environments which meet the criterion of weak scattering (no multiple scattering effects) the total amplitude weighting function A(r) is due to the incoherent addition of the individual targets and their position within the insonified volume. This relationship is given by, $$A(r) = \frac{\sqrt{N(r)}}{r^2} \exp^{-2ar} \left[ \int_0^\infty a^2 p(a)da \right]^{\frac{1}{2}} \times \left[ \int_0^{\pi/2} B^2(\theta)\sin\theta d\theta / \int_0^{\pi/2} \sin\theta d\theta \right]^{\frac{1}{2}} \quad (17)$$

for a differential range window dr, and absorption coefficient $\alpha$, and shows that the amplitude increases as the square root of the number of targets within an infinitesimal range $(r-dr/2 \leq r \leq r+dr/2)$ and is directly related to the standard deviation of target reflectives.

The received signal at any time $t=2r/c$ (where c is the speed of propagation in the medium) is composed of the complex linear superposition of the echoes from each differential range over $\Delta r$, with the midpoint of the scattering volume at $r=r_o$. The mean signal as a function of range, s(r) is, $$\bar{s}(r) = K \int_0^\infty f(r-r_o)A(r)e^{ikr}dr \quad (18)$$

where k is the carrier wavenumber. The transmitted pulse f(r) is normalized, i.e.

$$\int_0^\infty f(r)dr = 1,$$

and K represents all the system gains (a constant).

The actual target positions within the scattering volume are discrete and random between realizations from time separated transmit pulses. Therefore p(r) is represented by a sum of Dirac delta functions which give the spherical coordinates of each target relative to the transmitter. The individual realizations of s(r), namely $s_i(r)$ for each transmission (i) will observe Gaussian statistics as the number of independent signals from a fixed scattering volume and constant number density of targets is increased, through the law of large numbers.

Each realization $s_i(r)$ is an approximate estimate of $\bar{s}(r)$; however by averaging a large number of independent realizations, an accurate estimate of $\bar{s}(r)$ can be obtained. This method of estimating $\bar{s}(r)$ is in fact a Monte Carlo evaluation of the integral in equation (18). By monitoring the variance of $\bar{s}(r)$, $\sigma_{\bar{s}}^2(r)$, and recording the number of independent realizations $(n_i)$, an estimate of p(r) over $r_o - \Delta r/2 \leq r \leq r_o + \Delta r/2$ can be obtained. This is possible by using the inverse relationship that exists between $\sigma_{\bar{s}}^2(r)$ and the total number of individual targets $N_T(r)$ within the scattering volume. The mean number of targets within the scattering volume per realization $\bar{N}_o(r)$ is, $$\bar{N}_o(r) = \frac{N_T(r)}{n_i}, \quad (19)$$

where $N_T(r) =$ $$N_T(r) = \sum_{i=1}^{n_i} N_o(r)$$

is the total number of targets added over each of the independent realizations. The number density per unit range is then estimated from, $$\rho(r) \simeq \quad (20)$$

$$\bar{N}_o(r) \left[ 2\pi \int_0^{\pi/2} \int_0^\infty B^2(\theta)f(r-r_o)r^2 \sin\theta d\theta dr \right]^{-1}.$$

From the law of large numbers we know, $$\sigma_{\bar{s}(r)}^2 = \frac{\sigma_{s(r)}^2}{N_T(r)} \quad (21)$$

where $\sigma_s^2(r)$ is the variance of the total population and in practice is estimated by, $$\sigma_{\bar{s}(r)}^2 = \quad (22)$$

$$\left[ \sum_{i=1}^{n_i} Rs_i(r)Rs_i(r) - \left( \sum_{i=1}^{n_i} Rs_i(r) \right) \right.$$

$$\left. \left( \sum_{i=1}^{n_i} Rs_i(r) \right) / n_i \right] /(n_i - 1) +$$

$$i \left[ \sum_{i=1}^{n_i} s_i(r) s_i(r) - \left( \sum_{i=1}^{n_i} s_i(r) \right) \right.$$

$$\left. \left( \sum_{i=1}^{n_i} s_i(r) \right) / n_i \right] /(n_i - 1).$$

When the target reflectivities have some distribution other than a dirac delta function then the estimate of $\sigma_{\bar{s}}^2(r)$ will be biased. For example if p(a) is a Gaussian with variance $\sigma_a^2$ then $\sigma_{\bar{s}}^2(r)$ will be approximated by, $$\sigma_{\bar{s}(r)}^2 = \frac{\sigma_{s_0(r)}^2 + \sigma_a^2(1+i)}{N_T(r)}, \quad (23)$$

where $\sigma_{s_0(r)}$ is the variance from a scattering population with reflectivities=

$$\int_0^\infty a p(a) da$$

(the mean value). However, by an appropriate choice of beam-widths, the contributions from $\sigma_a^2$ will be negligible.

The variance $\sigma_{\bar{s}}^2(r)$ of the signal, is a complex quantity, $$\sigma_{\bar{s}(r)}^2 = \sigma_{\bar{I}}^2 + \sigma_{\bar{Q}}^2, \quad (24)$$

where $\sigma_{\bar{I}}^2$ and $\sigma_{\bar{Q}}^2$ are respectively the in-phase and quadrature components of the variance. The next step requires calculation of these components from a longer data set, which incorporates the data previously used. For example, considering for the sake of simplicity only the in-phase components, take the first 100 data points and calculate successive values of $\bar{I}$, the mean in-phase component, based on the first data point, the first two data points, etc. up to the first 100 data points. From all these calculated mean in-phase components of $\bar{I}_i$, where in this example i runs from 1 to 100, one may calculate the variance $(\sigma_{\bar{I}}^2)_{j=1}$, where the subscript j=1 refers to the first group of $\bar{I}$ that has been used. The process is then continued to calculate $\bar{I}$ on the first 101 points, 102 points, etc. to 200 points, and then calculate $(\sigma_{\bar{I}}^2)_{j=2}$. In this way, one may develop a sequence of values of the variance for mean values of $\bar{I}$ based on successively larger data sets. This process if given by, $$(\sigma_{\bar{I}}^2)_j = \quad (25)$$

$$\left[ \sum_{k=M(j-1)+1}^{Mj} I_k^2 - \left( \sum_{k=M(j-1)+1}^{Mj} I_k \right)^2 / M \right] / (M-1)$$

where in our example M=100.

If one now plots $(\sigma_{\bar{I}}^2)_j$ against $1/n_i$, then the points will approximate a straight line with a positive slope. Since it is known that $(\sigma_{\bar{I}}^2)_\infty \to 0$ for $n_i \to \infty$, one may utilize this fact to constrain the least squares fitting of a straight line through the origin to the resulting points. Let the slope of this line be m. Then calculate the mean number of targets $\bar{N}_0(r)$ in the scattering volume as, $$\bar{N}_0(r) = \mathfrak{R}(\sigma_{\bar{s}(r)}^2)/m \quad (26)$$

where $\mathfrak{R}(\sigma_{s(r)}^2)$ is given in equation (22). Finally, the number density of targets is then recovered from (20). This calculation can also be carried out for the quadrature components, yielding a second independent estimate of p(r). These two estimates are then averaged.

This calculation is subject to a bias, depending upon the distribution of target strengths p(a). The transducers can be designed to minimize this bias by increasing the beamwidth. More generally, if information is available on typical target strength distribution properties p(a), then the bias can be effectively removed from the estimate.

A useful check on statistical stationarity is obtained by plotting successive values of $\bar{I}$ as a function of $1/\sqrt{n_i}$. The distribution should converge linearly with increasing $n_i$. Nonlinearity in the convergence implies lack of stationarity in p(r). If the target number density is temporal within the scattering volume at $r_0$ then plots of $\bar{s}(r)$ versus $1/\sqrt{n_i}$ will have significant deviations from linearity as $n_i$ increases.

The final estimates of $\bar{s}(r) = \bar{I} + i\bar{Q}$, which utilize the full data provide a means of computing the mean coherent amplitude $\bar{A}(r)$ and phase $\bar{\Phi}(r)$ from a volume mirror in space. The corresponding amplitude and phase representation of $\bar{s}(r)$ is found from the usual transformation to polar coordinates; i.e.

$$\bar{A}(r) = \sqrt{\bar{I}^2 + \bar{Q}^2} \quad (27)$$

and, $$\bar{\Phi}(r) = \tan^{-1}(\bar{Q}/\bar{I}). \quad (28)$$

The accuracy of this phase estimate is given by equation (11).

The estimation of s(r) has a great potential since a stable coherent phase signal can be extracted for precise estimates of arrival time through interferometry. The technique presented here is equivalent to generating a volume mirror in space which can be utilized to extract physical information about the medium of propagation. In oceanographic applications, this includes remote measurements of both temperature and sound speed profiles.

As will be apparent to those skilled in the art, in light of the foregoing disclosure, many alterations and modifications are possible in the practice of this invention without departing from the spirit or scope thereof. Accordingly, the scope of the invention is to be construed in accordance with the substance defined by the following claims.

We claim:

1. A method of simulating phase coherent signal reflection in a medium containing a random distribution of targets capable of scattering signals transmitted through said medium, wherein the energy of signals directly scattered by said targets is significantly greater than the energy of signals which are scattered multiple times by said targets, said method comprising the steps of:

(a) modulating a reference signal having a wavelength "λ" which is small in comparison to the expected mean spacing between said targets;

(b) transmitting said modulated reference signal through said medium, whereby said targets produce scattered echoes of said modulated reference signal;

(c) receiving said scattered echo signals;

(d) for each of said received signals, deriving an in-phase component "I", and a quadrature component "Q";

(e) summing and normalizing said in-phase components to obtain "$\bar{I}$";

(f) separately summing and normalizing said quadrature components to obtain "$\bar{Q}$"; and (g) comulatively repeating steps (a) through (f) "n" times, until the variance of said cumulative, separately summed, normalized in-phase and quadrature components becomes a linear function of 1/n; and, (h) calculating the amplitude "$\overline{A}$" and the phase "$\overline{\phi}$" of said simulated signal reflection as:

$$A = \sqrt{\overline{I}^2 + \overline{Q}^2}$$

and $\phi = \arctan(\overline{Q}/\overline{I})$.

2. A method as defined in claim 1, further comprising:
(a) delaying commencement of said scattered echo signal receiving step for a selected time interval after transmission of said modulated reference signal through said medium; and
(b) continuing said receiving step for a selected time interval.

3. A method as defined in claim 1, wherein said medium is water.

4. A method as defined in claim 3, wherein said targets are fish and wherein said wavelength is significantly greater than the expected mean length of said fish.

5. A method as defined in claim 3, wherein said targets are plankton.

6. A method as defined in claim 1, wherein said medium is a liquid and wherein said targets are solid particles.

7. A method as defined in claim 1, wherei said medium is a liquid and wherein said targets are gas bubbles.

8. A method as defined in claim 1, wherein said medium is air and wherein said targets are raindrops.

9. A method of determining the mean number of targets "$\overline{N}_o(r)$" within the scattering voluem "V(r)" of a medium containing a random distribution of targets capable of scattering signals transmitted through said medium, wherein the energy of signals directly scattered by said targets is significantly greater than the energy of signals which are scattered multiple times by said targets, said method comprising the steps of:

(a) modulating a reference signal having a wavelength "$\lambda$" which is small in comparison to the expected mean spacing between said targets;
(b) transmitting said modulated reference signal through said medium, whereby said targets produce scattered echoes of said modulated reference signal;
(c) receiving said scattered echo signals;
(d) for each of said received signals, deriving an in-phase component "I", and a quadrature component "Q";
(e) summing and normalizing said in-phase components to obtain "$\overline{I}$";
(f) separately summing and normalizing said quadrature components to obtain "$\overline{Q}$"; and
(g) cumulatively repeating steps (a) through (e) "n" times, until the variance of "$\sigma_I^2$" of said normalized in-phase components becomes a linear function of 1/n having slope "m";
(h) calculating the mean number of targets $\overline{N}_o(r) = \sigma_I^2/m$;
(i) cumulatively repeating steps (a) through (d) and (f) "n'" times, until the variance "$\sigma_Q^2$" of said normalized quadrature components becomes a linear function of 1/n' having slope "m'";
(j) re-calculating the mean number of targets $\overline{N}_o(r) = \sigma_Q^2/m'$; and,
(k) determining said mean number of targets as the average of the values of $\overline{N}_o(r)$ calculated in steps (h) and (j) respectively.

10. A method of determining the number density "p(r)" of targets within the scattering volume "V(r)" of a medium containing a random distribution of targets capable of scattering signals transmitted through said medium, wherein the energy of signals directly scattered by said targets is significantly greater than the energy of signals which are multiply scattered by said targets, said method comprising the steps of:
(a) determining, in accordance with claim 9, the mean number of targets "$\overline{N}_o(r)$" within said scattering volume;
(b) determining said target density as $p(r) = \overline{N}_o(r)/V(r)$.

11. Apparatus for simulating phase coherent signal reflections in a medium containing a random distribution of targets capable of scattering signals transmitted through said medium, wherein the energy of signals directly scattered by said targets is significantly greater than the energy of signals which are scattered multiple times by said targets, said apparatus comprising:
(a) signal modulator means for modulating a reference signal having a wavelength which is small in comparison to the mean spacing between said targets;
(b) signal transmitter means for transmitting said modulated reference signal through said medium, whereby said targets produce scattered echoes of said modulated reference signal;
(c) signal receiver means phase locked with said reference signal, for receiving said scattered echo signals;
(d) first signal multiplier means for multiplying said received signals with said reference signal to produce in-phase components of said received signals;
(e) second signal multiplier means for multiplying said received signals with said a 90 phase-shifted replica of said reference signal to produce quadrature components of said received signals;
(f) first accumulator means for accumulating the sum of said in-phase components;
(g) second accumulator means for separately accumulating the sum of said quadrature components; and
(h) signal processing means for computing the variance of said in-phase and quadrature component sums.

* * * * *

UNITED STATES PATENT AND TRADEMARK OFFICE
CERTIFICATE OF CORRECTION

PATENT NO. : 4,872,146

DATED : October 3, 1989

INVENTOR(S) : David M. Farmer and R. Del Huston

It is certified that error appears in the above-identified patent and that said Letters Patent is hereby corrected as shown below:

Column 2, line 60, "$\bar{I}$ and $\bar{I}$" should be --$\bar{I}$ and $\bar{Q}$--.

Column 4, line 54, "Rayleight" should be --Rayleigh--.

Column 6, line 27, "$\Phi_o$" should be --$\emptyset_o$--.

Column 6, line 29, "$\Phi=d\Phi$" should be --$\Phi+d\Phi$--.

Column 6, line 46, "$\leqq\Phi\leqq$" should be --$\leq\Phi\leq$--.

Column 6, line 50, "FOr" should be --For--.

Column 6, line 53, "$\gamma^{311}=0$" should be --$\gamma^{-1}=0$--.

Column 7, line 8, "$\gamma\leqq 5$" should be --$\gamma\leq 5$--.

Column 7, line 55, "$k\geqq 0$" should be --$k\geq 0$--.

Column 10, line 21, omit "$N_T(r)=$" after the word "where".

Column 10, line 34, "$N_o(r)$" should be --$\bar{N}_o(r)$--.

Column 10, line 50, "$Rs_i(r)$" should be --$\Re s_i(r)$--.

Column 11, line 59, "$\Re(\sigma_{s(r)}{}^2))$" should be --$\Re(\sigma^2{}_{s(r)})$--.

UNITED STATES PATENT AND TRADEMARK OFFICE
CERTIFICATE OF CORRECTION

PATENT NO. : 4,872,146

DATED : October 3, 1989

INVENTOR(S) : David M. Farmer and R. Del Huston

It is certified that error appears in the above-identified patent and that said Letters Patent is hereby corrected as shown below:

Column 13, line 8, "$A = \sqrt{I^2 + Q^2}$" should be --$\bar{A} = \sqrt{\bar{I}^2 + \bar{Q}^2}$--.

Column 13, line 30, "wherei" should be --wherein--.

Column 13, line 35, "voluem" should be --volume--.

Column 13, line 55, "I" should be --$\bar{I}$--.

Signed and Sealed this

Twenty-sixth Day of March, 1991

Attest:

HARRY F. MANBECK, JR.

Attesting Officer     Commissioner of Patents and Trademarks